(12) United States Patent
Mahler et al.

(10) Patent No.: US 8,819,634 B2
(45) Date of Patent: Aug. 26, 2014

(54) SYSTEM AND METHOD TO VALIDATE TEST CASES

(71) Applicants: Juergen Mahler, Malsch (DE); Bjoern Panter, Saabruecken (DE)

(72) Inventors: Juergen Mahler, Malsch (DE); Bjoern Panter, Saabruecken (DE)

(73) Assignee: SAP AG, Walldorf (DE)

( * ) Notice: Subject to any disclaimer, the term of this patent is extended or adjusted under 35 U.S.C. 154(b) by 187 days.

(21) Appl. No.: 13/630,728

(22) Filed: Sep. 28, 2012

(65) Prior Publication Data

US 2014/0096111 A1    Apr. 3, 2014

(51) Int. Cl.
*G06F 9/44* (2006.01)
*G06F 11/36* (2006.01)

(52) U.S. Cl.
CPC ........ *G06F 11/3664* (2013.01); *G06F 11/3688* (2013.01); *G06F 11/3676* (2013.01)
USPC ...................................................... 717/124

(58) Field of Classification Search
CPC .................................................. G06F 11/3676
USPC ...................................................... 717/124
See application file for complete search history.

(56) References Cited

U.S. PATENT DOCUMENTS

| | | | |
|---|---|---|---|
| 6,862,696 B1 | 3/2005 | Voas et al. | |
| 7,673,261 B2 * | 3/2010 | Adir et al. | 716/106 |
| 8,056,058 B2 * | 11/2011 | Huang et al. | 717/124 |
| 8,627,287 B2 * | 1/2014 | Fanning et al. | 717/124 |
| 2003/0046613 A1 * | 3/2003 | Farchi et al. | 714/38 |
| 2003/0093716 A1 * | 5/2003 | Farchi et al. | 714/34 |
| 2004/0107415 A1 * | 6/2004 | Melamed et al. | 717/124 |
| 2009/0070746 A1 * | 3/2009 | Dhurjati et al. | 717/128 |
| 2009/0144698 A1 | 6/2009 | Fanning et al. | |
| 2012/0030651 A1 * | 2/2012 | Kemmler et al. | 717/124 |

OTHER PUBLICATIONS

Hong Zhu, et al.; "Software Unit Test Coverage and Adequacy"; ACM computing surveys (csur) 29.4 (Dec. 1997): 366-427.*
"Levels of Software Testing"; tutorialspoint.com website as captured by the Wayback Machine Internet Archive (archive.org) on May 10, 2012.*
"Dr. Dobb's Selecting Test Cases Based on User Priorities", [Online]. Retrieved from the Internet: <URL: http://www.drdobbs.com/articleIprint?articleid=l84414580&siteS• >, (Mar. 1, 2000), 6 pgs.
European Application Serial No. 13004578.4, Extended European Search Report mailed Apr. 17, 2014, 10 pgs.
Chang, Wen-Kui, et al., "Impartial Evaluation in Software Reliability Practice", The Journal of Systems and Software 76, [Online]. Retrieved from the Internet: <URL: www.elsevier.com/locate/jss>, (2005), 99-110.

* cited by examiner

*Primary Examiner* — Qing Chen
*Assistant Examiner* — Clint A Thatcher
(74) *Attorney, Agent, or Firm* — Schwegman Lundberg & Woessner P.A.

(57) ABSTRACT

A system and method includes obtaining and storing, on a computer readable storage device, a list of a set of test cases designed to test logical code units in multiple objects of a software program in a design environment, identifying a first set logical code units covered by the test cases, identifying a second set of logical code units corresponding to a productive environment, and comparing, via a computer, the first and second sets of logical code units to generate an evaluation of the test cases for the software program in the productive environment.

21 Claims, 5 Drawing Sheets

SYSTEM AND METHOD TO VALIDATE TEST CASES

BACKGROUND

Test cases for software systems are written to cause execution of logical code units to verify that the software system works as intended. Many software systems implement a vast number of functions that utilize different combinations of logical code units. It can be desirable to exercise as many of these logical code unit combinations as practical in order to robustly test the software system.

SUMMARY

A method includes obtaining and storing, on a computer readable storage device, a list of a set of test cases designed to test logical code units in multiple objects of a software program in a design environment, identifying a first set logical code units covered by the test cases, identifying a second set of logical code units corresponding to a productive environment, comparing, via a computer, the first and second sets of logical code units to generate an evaluation of the test cases for the software program in the productive environment.

In a further embodiment, a method includes obtaining and storing, on a computer readable storage device, a list of set of test cases designed to test logical code units in multiple objects of a software program, obtaining logical code unit usage information from a productive environment where the software program is operating, and comparing, via a computer, the test cases to the logical code unit usage information to generate an evaluation of the test cases for the software program in the productive environment.

A computer system includes a test environment to generate a set of test cases stored on a storage device to test logical code units in multiple objects of a software program. A network connection is provided to couple to a remote productive system executing the software program to obtain logical code unit usage information from execution of the software program. A compare module running on the computer system is provided to compare the execution of the test cases to the logical code unit usage information to generate an evaluation of the executed test cases for the software program in the productive environment.

In yet a further embodiment, a method includes obtaining and storing, on a computer readable storage device, a list of set of test cases designed to test logical code units in multiple objects of a software program, identifying a first set logical code units covered by the test, obtaining a productive environment bill of materials for a customer system, identifying a second set of logical code units corresponding the productive environment bill of materials, and comparing the first and second sets of logical code units to generate an evaluation of the test cases for the software program in the productive environment.

In still a further embodiment, a computer system includes a test environment to generate a set of test cases stored on a storage device to test logical code units in multiple objects of a software program. A module identifies a first set logical code units covered by the test and obtains a productive environment bill of materials for a customer system. A module identifies a second set of logical code units corresponding the productive environment bill of materials. A compare module running on the computer system compares the test cases to the logical code unit usage information to generate an evaluation of the test cases for the software program in the productive environment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

While test cases are written to exercise as many functional code units making up a software system, many times, a productive environment for the software system providing functionality to customers may not utilize all the functions of the software system. In such cases the test cases may exercise more functional code units than are actually used by the customer. This can result in tests running longer than needed to adequately test the customer software.

Figure 1:
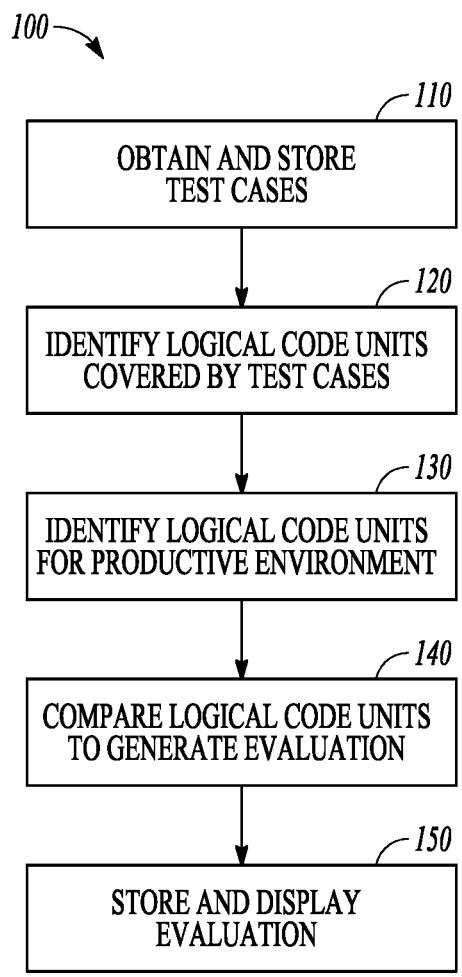
FIG. 1 is a flowchart illustrating a method of evaluating test cases for a productive environment according to an example embodiment.

A method 100 illustrated in flowchart form in FIG. 1 includes obtaining and storing, on a computer readable storage device, a list of a set of test cases 110 designed to test logical code units in multiple objects of a software program to a design environment. A first set logical code units covered by the test cases are identified at 120, and a second set of logical code units corresponding to a productive environment are identified at 130. The first and second sets of logical code units are compared at 140 by a computer to generate an evaluation of the test cases for the software program in the productive environment. Evaluation results may be stored and displayed at 150 in a dashboard or other display.

In one embodiment, the system obtains logical code unit usage information from a productive environment where the software program is operating over a selected time frame. The system may then compare the test cases to the logical code unit usage information to generate an evaluation of the test cases for the software program in the productive environment.

In a further embodiment, a bill of materials corresponding to the productive environment is obtained and used to determine the logical code units that are likely to be used by the customer. These logical code units are then compared to the logical code units covered by the test cases to evaluate the test cases for the software program in the productive environment.

Figure 2:
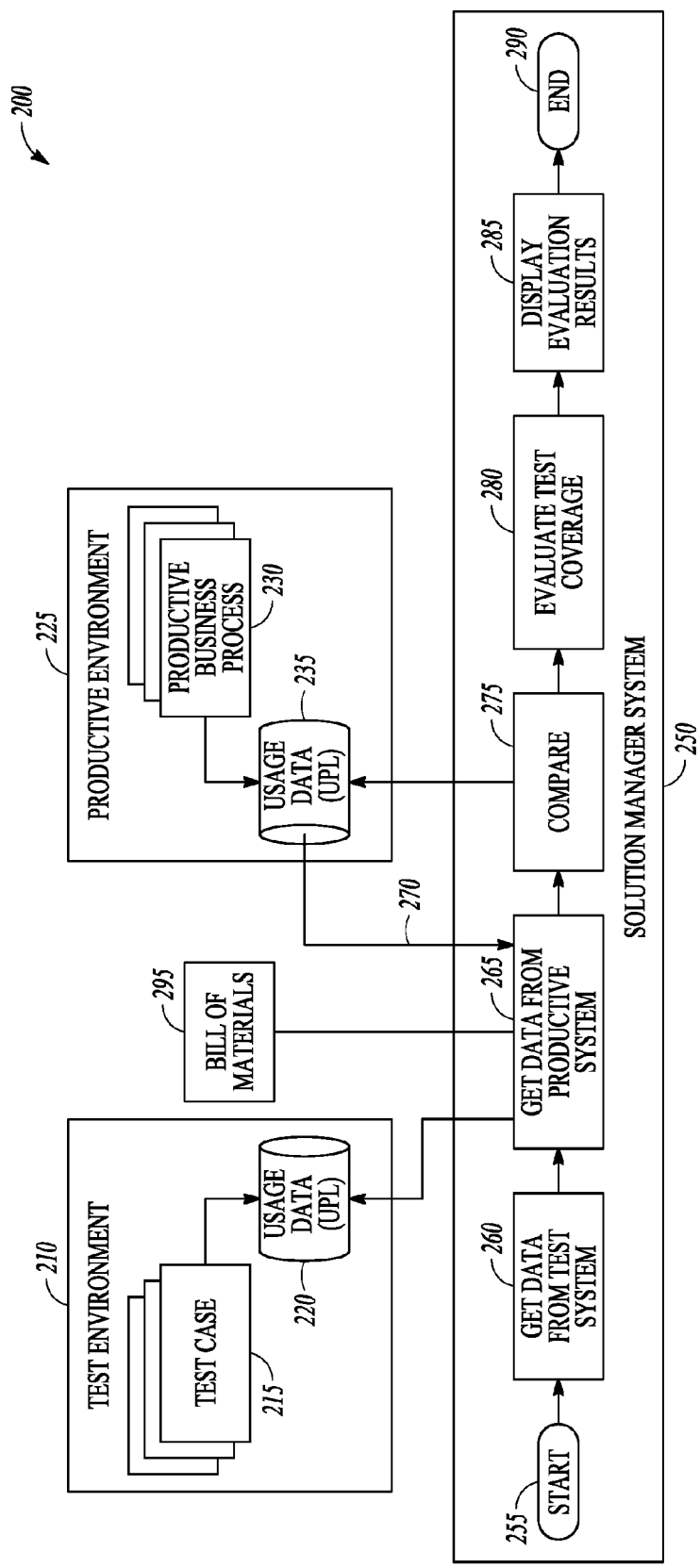
FIG. 2 is a block diagram of a system for evaluating test cases for a productive environment according to an example embodiment.

FIG. 2 is a block diagram illustrating a system 200 to evaluate test coverage and quality. A test environment or system 210 includes a set of test cases 215 that are designed to extensively exercise logical code units in a software system. This set of test cases may be thought of as a logical view of test cases in the test environment. A productive environment is indicated at 225. A productive business process containing software with multiple logical code units is shown at 230 and is executing. Usage data from the execution of the business process is collected as shown at 235 and may be encrypted. The usage data 235 contains a record of the logical code units that are executed during selected periods of time. This provides a view of the reality of the execution of the software, identifying what logical code units are actually executed over a selected period of time. The date may also be processed to provide statistical information such as counts of the use of the various logical code units, frequency of use, and other data related to the use of the software. The usage data 235 may be made available via an application interface 240.

A solution manager system is shown at 250, and executes a method to evaluate the test cases. The method starts at 255, and obtains data from the test system 210 at 260. At 265, the usage data 235 from the productive system is collected via a network connection 270, and decrypted if needed. At 275, the system 250 compares the usage data with the information from the test system to determine the coverage and/or quality of the test cases with respect to the functional code units executed in the productive environment. Evaluation results are provided at 280 and may be displayed at 285 via a dashboard. The process ends at 290. The results may be used to add additional tests that are more likely to exercise functions actually used in the productive environment. Further, functions that are not executed in the productive environment may help identify test cases that are not necessary to adequately test the software. Such tests may be removed from the set of test cases to help speed testing.

In one embodiment, the software comprises business management software to facilitate a business process. The evaluation may include an evaluation of coverage of the test cases for the software program in the productive environment that quantifies an overlap of coverage between the logical code units tested by the set of test cases and the logical code units used in the productive environment. The functions may be executed entirely on the customer system or any mix of systems and servers in various embodiments.

Figure 3:
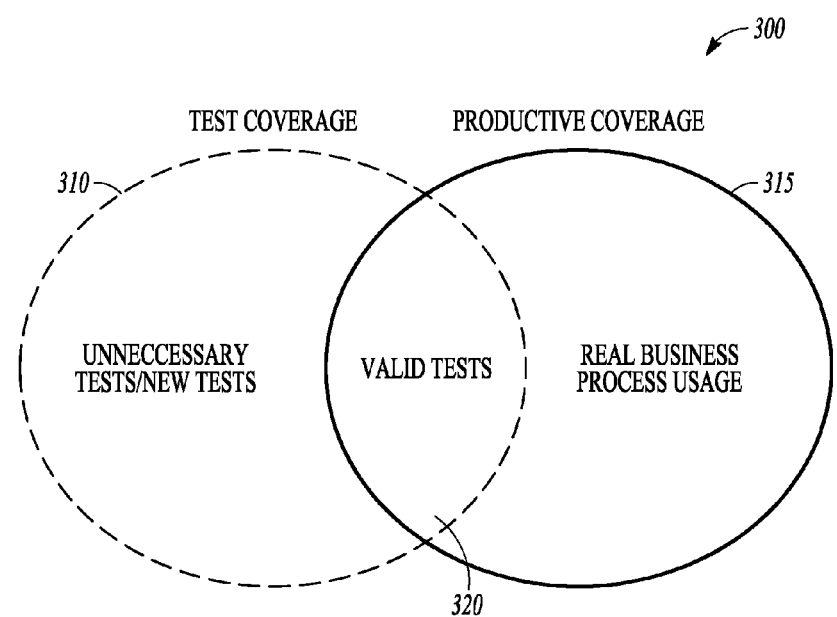
FIG. 3 is a chart illustrating covering of a set of test cases for a productive environment according to an example embodiment.
Figure 4:
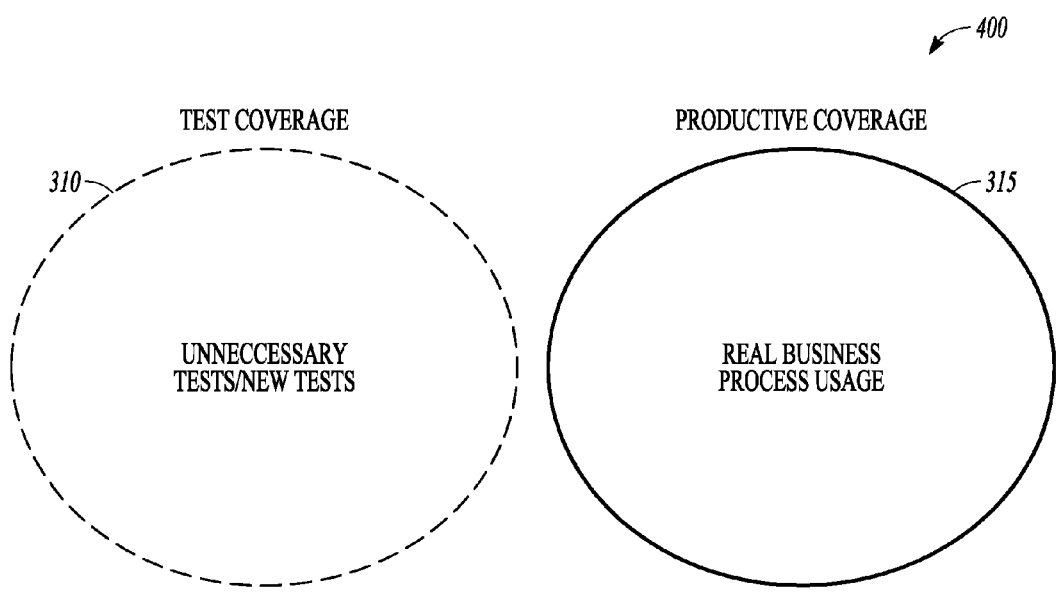
FIG. 4 is a chart illustrating coverage of a set of test cases for a productive environment in a worst case according to an example embodiment.
Figure 5:
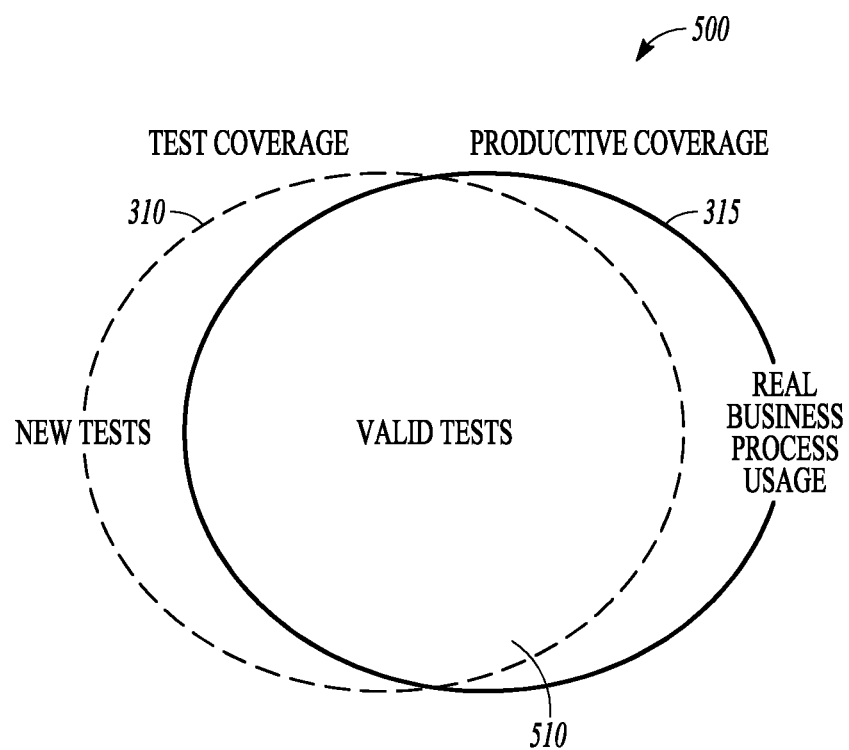
FIG. 5 is a chart illustrating coverage of a set of test cases for a productive environment indicating a valid set of tests according to an example embodiment.

FIGS. 3, 4, and 5 are charts illustrating various coverages of the test cases. Chart 300 in FIG. 3 illustrates test coverage by a circle 310 for a development environment version of a software system. Test coverage for a real business process in a productive environment is illustrated by a circle at 315. The overlap between the clicks indicated at 320 corresponds to valid tests. Valid tests are basically tests that exercise logical code units that correspond to those likely to be exercised in the productive environment. FIG. 4 at 400 indicates no overlap between the test cases 310 and the productive environment 315. This is the worst case. FIG. 5 at 500 illustrates a significant overlap 510 of the test cases 310 and productive environment 315. Such overlap is indicative of a valid set of tests.

These charts may be illustrated in a dashboard, along with statistics, such as percentage of overlap, lists of test cases and logical code units if desired. In further embodiments, the logical code units that are executed more frequently in the productive environment may be weighted so that the percentage of overlap increases if frequently executed logical code units are covered by the test cases. Logical code units not likely to be executed, or executed less frequently, may be weighted lower. In still further embodiments, logical code units may be weighted based on an importance to the functioning of the business.

In further embodiments, the logical code unit usage information is collected via network connection 270 to a solution manager program executing on the customer system 225 executing the software program 280 in the productive environment. The logical code unit usage information is obtained via the application program interface 240 of the solution manager program and may be in an encrypted form.

In one embodiment, the logical code unit usage information provides statistical information regarding usage of logical code units for a selected period of time. The evaluation 280 may include an evaluation of the test coverage of the set of test cases with respect to the software executing in the productive environment. The evaluation may include an evaluation of the test quality of the set of test cases with respect to the software executing in the productive environment.

In a further embodiment, element or module 260 may obtain a bill of materials from an enterprise resource management system 295 or other storage device. The bill of materials may be used to identify the software as purchased for a customer productive environment. Logical code units that are likely to be executed or otherwise available in the purchased software may be identified and used in place of the actual usage data for the comparison. In this embodiment, the connection of the customer system is not needed, as all the information utilized to determine the productive environment logical code units is provided by the bill of materials.

In one example embodiment, the information regarding the productive environment may indicate that ten objects of the software system are likely to be executed. While actual productive environments may involve thousands of objects, ten is used as a simple example. From these ten objects, logical code units, such as those corresponding to methods in the objects are identified. Objects and corresponding logical code units are also identified from the test cases, providing the information used for the comparison.

In some embodiments, a guided procedure may be used to perform the functions. A user may be prompted to select a software system to test, a time frame over which to identify logical code units, or whether to use a bill of materials or actual usage data. The user may also be prompted as to desired information to display related to the evaluation and the format of the display, such as a dashboard or spreadsheet format.

Figure 6:
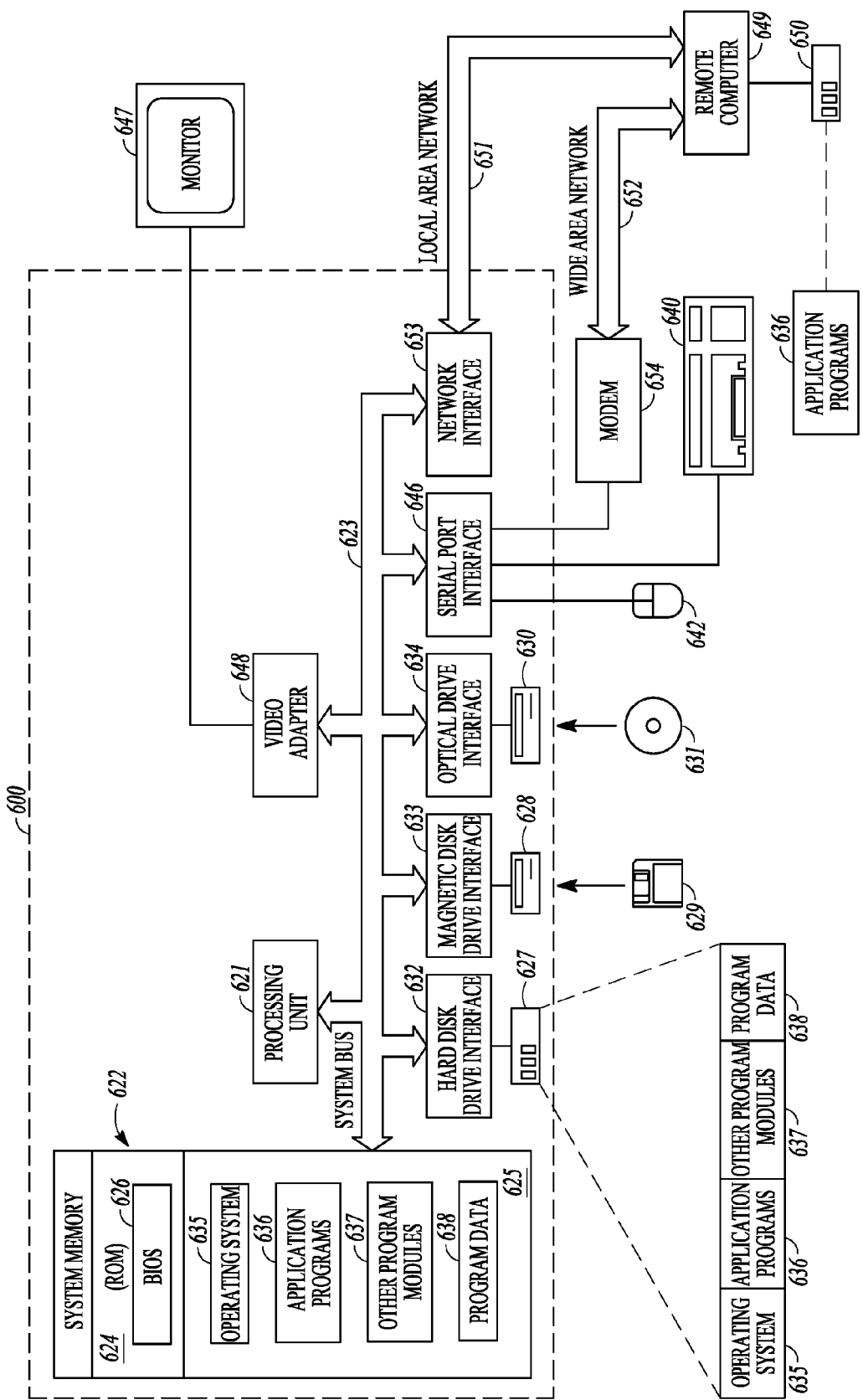
FIG. 6 is a block diagram illustrating an example computer system for implementing one or more example embodiments.

FIG. 6 is a block diagram of a computer system to implement methods and functions according to an example embodiment. In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 600 (e.g. a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, may be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 600 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 600 may operate in a networked environment using logical connections to one or more remote computers or servers, such as remote computer 649. These logical connections are achieved by a communication device coupled to or a part of the computer 600; other types of communication devices may also be used. The remote computer 649 can be another computer, a server, a router, a network PC, a client, a peer device or other common network node, and typically includes many or all of the elements described above I/O relative to the computer 600, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 600 is connected to the LAN 651 through a network interface or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 600 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

GENERIC EXAMPLE

1. A method comprising:
   obtaining and storing, on a computer readable storage device, a list of a set of test cases designed to test logical code units in multiple objects of a software program in a design environment;
   identifying a first set logical code units covered by the test cases;
   identifying a second set of logical code units corresponding to a productive environment; and
   comparing, via a computer, the first and second sets of logical code units to generate an evaluation of the test cases for the software program in the productive environment.

Examples for usage data from a productive environment:
1. A method comprising:
   obtaining and storing, on a computer readable storage device, a list of set of test cases designed to test logical code units in multiple objects of a software program;
   obtaining logical code unit usage information from a productive environment where the software program is operating; and comparing, via a computer, the test cases to the logical code unit usage information to generate an evaluation of the test cases for the software program in the productive environment.

2. The method of example 1 wherein the software comprises business management software to facilitate a business process.

3. The method of any of examples 1-2 wherein the evaluation includes an evaluation of coverage of the test cases for the software program in the productive environment that quantifies an overlap of coverage between the logical code units tested by the set of test cases and the logical code units used in the productive environment.

4. The method of any of examples 1-3 wherein the logical code unit usage information is collected via a network connection to solution manager program executing on a customer system executing the software program in the productive environment.

5. The method of example 4 wherein the logical code unit usage information is obtained via an application program interface of the solution manager program.

6. The method of any of examples 4-5 wherein the logical code unit usage information is obtained in an encrypted form.

7. The method of any of examples 4-6 wherein the logical code unit usage information provides statistical information regarding usage of logical code units for a selected period of time.

8. The method of any of examples 1-7 wherein the evaluation includes an evaluation of the test coverage of the set of test cases with respect to the software executing in the productive environment.

9. The method of any of examples 1-8 wherein the evaluation includes an evaluation of the test quality of the set of test cases with respect to the software executing in the productive environment.

10. A computer readable storage device having instructions for causing a computer to perform a method, the method comprising comprising:

obtaining a list of set of test cases designed to test logical code units in multiple objects of a software program;

obtaining logical code unit usage information from a productive environment where the software program is operating; and comparing the test cases to the logical code unit usage information to generate an evaluation of the test cases for the software program in the productive environment.

11. The computer readable storage device of example 10 wherein the software comprises business management software to facilitate a business process, and wherein the evaluation includes and evaluation of coverage of the test cases for the software program in the productive environment that quantifies an overlap of coverage between the logical code units tested by the set of test cases and the logical code units used in the productive environment.

12. The computer readable storage device of any of examples 10-11 wherein the logical code unit usage information is collected via a network connection to solution manager program executing on a customer system executing the software program in the productive environment.

13. The computer readable storage device of example 12 wherein the logical code unit usage information is obtained via an application program interface of the solution manager program and wherein the logical code unit usage information is obtained in an encrypted form.

14. The computer readable storage device of any of examples 12-13 wherein the logical code unit usage information provides statistical information regarding usage of logical code units for a selected period of time.

15. The computer readable storage device of any of examples 10-15 wherein the evaluation includes an evaluation of the test coverage and test quality of the set of test cases with respect to the software executing in the productive environment.

16. A computer system comprising:

a test environment to generate a set of test cases stored on a storage device to test logical code units in multiple objects of a software program;

a network connection to couple to a remote productive system executing the software program to obtain logical code unit usage information from execution of the software program; and a compare module running on the computer system to compare the test cases to the logical code unit usage information to generate an evaluation of the test cases for the software program in the productive environment.

17. The computer system of example 16 wherein the software comprises business management software to facilitate a business process, and wherein the evaluation includes and evaluation of coverage of the test cases for the software program in the productive environment that quantifies an overlap of coverage between the logical code units tested by the set of test cases and the logical code units used in the productive environment.

18. The computer system of any of examples 16-17 wherein the logical code unit usage information is obtained via an application program interface of the solution manager program and wherein the logical code unit usage information is obtained in an encrypted form.

19. The computer system of any of examples 16-18 wherein the logical code unit usage information provides statistical information regarding usage of logical code units for a selected period of time.

20. The computer system of any of examples 16-19 wherein the evaluation includes an evaluation of the test coverage and test quality of the set of test cases with respect to the software executing in the productive environment.

Examples involving evaluation based on a bill of materials

1. A method comprising:

obtaining and storing, on a computer readable storage device, a list of set of test cases designed to test logical code units in multiple objects of a software program;

identifying a first set logical code units covered by the test;

obtaining a productive environment bill of materials for a customer system;

identifying a second set of logical code units corresponding the productive environment bill of materials; and comparing the first and second sets of logical code units to generate an evaluation of the test cases for the software program in the productive environment.

2. The method of example 1 wherein the software comprises business management software to facilitate a business process.

3. The method of any of examples 1-2 wherein the evaluation includes an evaluation of coverage of the test cases for the software program that quantifies an overlap of coverage between the first and second sets of logical code units.

4. The method of any of examples 1-3 wherein the logical code unit usage information provides statistical information regarding usage of logical code units for a selected period of time.

5. The method of any of examples 1-4 wherein the evaluation includes an evaluation of the test coverage of the set of test cases with respect to the software executing in the productive environment as represented by the bill of materials for the customer system.

6. The method of any of examples 1-5 wherein the evaluation includes an evaluation of the test quality of the set of test cases with respect to the software executing in the productive environment as represented by the bill of materials for the customer system.

7. A computer readable storage device having instructions for causing a computer to perform a method, the method comprising:
obtaining a list of set of test cases designed to test logical code units in multiple objects of a software program;
obtaining a test case bill of materials for which the set of test cases was designed to test to identify a first set logical code units covered by the test;
obtaining a productive environment bill of materials for a customer system;
identifying logical a second set of logical code units corresponding the productive environment bill of materials; and
comparing the first and second sets of logical code units to generate an evaluation of the test cases for the software program in the productive environment.

8. The computer readable storage device of example 7 wherein the software comprises business management software to facilitate a business process.

9. The computer readable storage device of any of examples 7-8 wherein the evaluation includes an evaluation of coverage of the test cases for the software program that quantifies an overlap of coverage between the first and second sets of logical code units.

10. The computer readable storage device of any of examples 7-9 wherein the logical code unit usage information provides statistical information regarding usage of logical code units for a selected period of time.

11. The computer readable storage device of any of examples 7-10 wherein the evaluation includes an evaluation of the test coverage of the set of test cases with respect to the software executing in the productive environment as represented by the bill of materials for the customer system.

12. The computer readable storage device of any of examples 7-11 wherein the evaluation includes an evaluation of the test quality of the set of test cases with respect to the software executing in the productive environment as represented by the bill of materials for the customer system.

13. A computer system comprising:
a test environment to generate a set of test cases stored on a storage device to test logical code units in multiple objects of a software program;
a module to identifying a first set logical code units covered by the test and obtain a productive environment bill of materials for a customer system;
a module to identify a second set of logical code units corresponding the productive environment bill of materials; and
a compare module running on the computer system to compare the test cases to the logical code unit usage information to generate an evaluation of the test cases for the software program in the productive environment.

14. The computer system of example 13 wherein the software comprises business management software to facilitate a business process, and wherein the evaluation includes and evaluation of coverage of the test cases for the software program in the product environment that quantifies an overlap of coverage between the sets of logical code units.

15. The computer system of any of examples 13-14 wherein the evaluation includes an evaluation of the test coverage and test quality of the set of test cases with respect to the software executing in the productive environment as represented by the bill of materials.

Although a few examples and embodiments have been described in detail above, other modifications are possible. Different combinations of feature described with respect to different examples and embodiments may be made. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising: obtaining and storing, on a computer readable storage device, a list of a set of test cases designed to test logical code units in multiple objects of a software program in a design environment; identifying a first set logical code units covered by the test cases; identifying a second set of logical code units corresponding to a productive environment; comparing, via a computer, the first and second sets of logical code units to generate an evaluation of the test cases for the software program in the productive environment; and storing the evaluation on a computer readable storage device.

2. A method comprising: obtaining and storing, on a computer readable storage device, a list of set of test cases designed to test logical code units in multiple objects of a software program; obtaining logical code unit usage information from a productive environment where the software program is operating; comparing, via a computer, the test cases to the logical code unit usage information to generate an evaluation of the test cases for the software program in the productive environment; and storing the evaluation on a computer readable storage device.

3. The method of claim 2 wherein the software comprises business management software to facilitate a business process.

4. The method of claim 2 wherein the evaluation includes an evaluation of coverage of the test cases for the software program in the productive environment that quantifies an overlap of coverage between the logical code units tested by the set of test cases and the logical code units used in the productive environment.

5. The method of claim 2 wherein the logical code unit usage information is collected via a network connection to solution manager program executing on a customer system executing the software program in the productive environment.

6. The method of claim 5 wherein the logical code unit usage information is obtained via an application program interface of the solution manager program.

7. The method of claim 5 wherein the logical code unit usage information is obtained in an encrypted form.

8. The method of claim 5 wherein the logical code unit usage information provides statistical information regarding usage of logical code units for a selected period of time.

9. The method of claim 2 wherein the evaluation includes an evaluation of the test coverage of the set of test cases with respect to the software executing in the productive environment.

10. The method of claim 2 wherein the evaluation includes an evaluation of the test quality of the set of test cases with respect to the software executing in the productive environment.

11. A non-transitory computer readable storage device having instructions for causing a computer to perform a method, the method comprising: obtaining a list of set of test cases designed to test logical code units in multiple objects of a software program; obtaining logical code unit usage information from a productive environment where the software program is operating; comparing the test cases to the logical code unit usage information to generate an evaluation of the test cases for the software program in the productive environment; and storing the evaluation on a computer readable storage device.

12. The non-transitory computer readable storage device of claim 11 wherein the software comprises business management software to facilitate a business process, and wherein the evaluation includes and evaluation of coverage of the test cases for the software program in the productive environment that quantifies an overlap of coverage between the logical code units tested by the set of test cases and the logical code units used in the productive environment.

13. The non-transitory computer readable storage device of claim 11 wherein the logical code unit usage information is collected via a network connection to solution manager program executing on a customer system executing the software program in the productive environment.

14. The non-transitory computer readable storage device of claim 13 wherein the logical code unit usage information is obtained via an application program interface of the solution manager program and wherein the logical code unit usage information is obtained in an encrypted form.

15. The non-transitory computer readable storage device of claim 13 wherein the logical code unit usage information provides statistical information regarding usage of logical code units for a selected period of time.

16. The non-transitory computer readable storage device of claim 11 wherein the evaluation includes an evaluation of the test coverage and test quality of the set of test cases with respect to the software executing in the productive environment.

17. A computer system comprising: a test environment comprising a processor to generate a set of test cases stored on a storage device to test logical code units in multiple objects of a software program; a network connection to couple to a remote productive system executing the software program to obtain logical code unit usage information from execution of the software program; a compare module running on the computer system to compare the test cases to the logical code unit usage information to generate an evaluation of the test cases for the software program in the productive environment, and store the evaluation on a computer readable storage device.

18. The computer system of claim 17 wherein the software comprises business management software to facilitate a business process, and wherein the evaluation includes and evaluation of coverage of the test cases for the software program in the productive environment that quantifies an overlap of coverage between the logical code units tested by the set of test cases and the logical code units used in the productive environment.

19. The computer system of claim 17 wherein the logical code unit usage information is obtained via an application program interface of the solution manager program and wherein the logical code unit usage information is obtained in an encrypted form.

20. The computer system of claim 17 wherein the logical code unit usage information provides statistical information regarding usage of logical code units for a selected period of time.

21. The computer system of claim 17 wherein the evaluation includes an evaluation of the test coverage and test quality of the set of test cases with respect to the software executing in the productive environment.

* * * * *